United States Patent
Hunukumbure et al.

(10) Patent No.: US 10,873,432 B2
(45) Date of Patent: Dec. 22, 2020

(54) APPARATUS AND METHOD FOR LOCATING OF PHASE TRACKING REFERENCE SIGNAL IN WIRELESS COMMUNICATION SYSTEM

(71) Applicant: Samsung Electronics Co., Ltd., Suwon-si (KR)

(72) Inventors: Mythri Hunukumbure, Staines (GB); Yinan Qi, Staines (GB); Hyunil Yoo, Suwon-si (KR); Hyungju Nam, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 16/018,834

(22) Filed: Jun. 26, 2018

(65) Prior Publication Data

US 2019/0081752 A1  Mar. 14, 2019

(30) Foreign Application Priority Data

Sep. 8, 2017  (GB) .................................. 1714492.4

(51) Int. Cl.
*H04W 72/04* (2009.01)
*H04L 5/00* (2006.01)

(52) U.S. Cl.
CPC ....... *H04L 5/0048* (2013.01); *H04W 72/0453* (2013.01); *H04L 5/005* (2013.01); *H04L 5/0051* (2013.01); *H04L 5/0053* (2013.01)

(58) Field of Classification Search
CPC ........... H04W 72/0453; H04W 72/044; H04W 72/042; H04L 5/0051
See application file for complete search history.

(56) References Cited

U.S. PATENT DOCUMENTS 9,635,705 B2 * 4/2017 Lu .......................... H04W 60/00
2013/0044834 A1 2/2013 Koorapaty et al.
(Continued)

FOREIGN PATENT DOCUMENTS

EP  3 595 226 A1  1/2020

OTHER PUBLICATIONS

Great Britain Office Action dated Jan. 24, 2018, issued in Great Britain application No. GB1714492.4.
(Continued)

*Primary Examiner* — Wei Zhao
(74) *Attorney, Agent, or Firm* — Jefferson IP Law, LLP

(57) ABSTRACT

A method of providing a phase tracking reference signal (PTRS) amongst a set of resource blocks (RBs) and an apparatus therefor are provided. The method includes selecting a particular RB amongst the set of RBs (operation S41) and arranging the PTRS in the particular RB (operation S42). The PTRS is locatable by a user equipment (UE) device from amongst the set of RBs. Also provided are a set of resource blocks (RBs), a transmission/reception point (TRP), a UE device, a system including a TRP and a UE device, a method therefor and a computer-readable storage medium. The method and apparatus relate to a pre-$5^{th}$-Generation (5G) or 5G communication system to be provided for supporting higher data rates Beyond $4^{th}$-Generation (4G) communication system such as Long-Term Evolution (LTE).

14 Claims, 12 Drawing Sheets

(56) References Cited

U.S. PATENT DOCUMENTS

| | | | |
|---|---|---|---|
| 2016/0112173 A1 | 4/2016 | Wang et al. | |
| 2018/0279280 A1* | 9/2018 | Nimbalker | H04W 72/042 |
| 2019/0165910 A1* | 5/2019 | Lee | H04L 1/0011 |
| 2019/0305908 A1* | 10/2019 | Lee | H04L 1/0009 |

OTHER PUBLICATIONS

CMCC; Phase-Tracking Reference Signal Design for High-Frequency Systems; 3GPP TSG RAN WG1 NR Ad-Hoc Meeting; R1-1700438; Jan. 20, 2017, Spokane, USA.

Ericsson; 5G New Radio-Designing for the Future. (2017).

ZTE, 'Discussion on RS for phase tracking', R1-1707132, 3GPP TSG RAN WG1, Meeting #89, Hangzhou, China, May 7, 2017, See section 2.3.

CATT, 'Considerations on RS for phase tracking', R1-1712385, 3GPP TSG RAN WG1 Meeting #90, Prague, Czechia, Aug. 12, 2017, See sections 2.2-3; and figure 4.

Ericsson, 'On DL PTRS design', R1-1714314, 3GPP TSG RAN WG1 Meeting #90, Prague, Czechia, Aug. 12, 2017, See section 2.6.

Xinwei, 'Evaluation and Discussion on DL Phase Tracking RS Design', R1-1707088, 3GPP TSG RAN WG1 Meeting #89, Hangzhou, China, May 5, 2017, See sections 4-5.

Samsung, 'DL PT-RS design', R1-1703605, 3GPP TSG RAN WG1 Meeting #90, Prague, Czech, Aug. 11, 2017 See sections 2.1-2.3.

International Search Report dated Oct. 10, 2018, issued in International Application No. PCT/KR2018/007389.

LG Electronics, "On UL PT-RS design", 3GPP TSG RAN WG1 Meeting #90, R1-1714622, Prague Czech Republic, Aug. 21-25, 2017.

Huawei, HiSilicon, "PTRS for CP-OFDM", 3GPP TSG RAN WG1 Meeting #90, R1-1712241, Prague, Czech Republic, Aug. 21-25, 2017.

Catt, "Considerations on RS for phase..",3GPP TSG RAN WG1 Meeting #90, R1-1712385, Prague, Czech Republic, Aug. 21-25,.

Ericsson, "On DL PTRS design",3GPP TSG RAN WG1 Meeting #90, R1-1714314, Prague, Czechia Aug. 21-25, 2017.

European Search Report dated Sep. 18, 2020 issued in European Application No. 18853696.5.

* cited by examiner

| | $P_{offset}$ =0 | $P_{offset}$ =1 | $P_{offset}$ =2 | $P_{offset}$ =3 | | | | |
|---|---|---|---|---|---|---|---|---|
| RB Allocated to UE $d_f = 1/4$ | RB1 | RB2 | RB3 | RB4 | RB5 | RB6 | RB7 | RB8 |

| PRB Allocated to UE PTRS $d_f=1/2$ CSI-RS $d_f=1/2$ | RB1-PTRS | RB2-CSIRS | RB3-PTRS | RB4-CSIRS | RB5-PTRS | RB6-CSIRS | RB7-PTRS | RB8-CSIRS |
|---|---|---|---|---|---|---|---|---|

| RB Allocated to UE1 $d_f=1/4$ | RB1-PTRS | RB2 | RB3 | RB4 | RB5-PTRS | RB6 | RB7 | RB8 | RB9-PTRS | RB10 |
|---|---|---|---|---|---|---|---|---|---|---|

| RB Allocated to UE2 $d_f = 1/4$ | RB1 | RB2-PTRS | RB3 | RB4 | RB5 | RB6-PTRS | RB7 | RB8 | RB9 | RB10-PTRS |

FIG.9B

APPARATUS AND METHOD FOR LOCATING OF PHASE TRACKING REFERENCE SIGNAL IN WIRELESS COMMUNICATION SYSTEM

CROSS-REFERENCE TO RELATED APPLICATION(S)

This application is based on and claims priority under 35 U.S.C. § 119 of a United Kingdom patent application number 1714492.4, filed on Sep. 8, 2017, in the United Kingdom Patent Office, the disclosure of which is incorporated by reference herein in its entirety.

BACKGROUND

1. Field

The disclosure relates to controlling networks, such as cellular networks. More particularly, the disclosure relates to providing phase tracking reference signals (PTRS) amongst a set of resource blocks (RBs).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Generally, user equipment (UE) devices may receive data transmitted by a plurality of transmission/reception points (TRPs) (also known as transception points) in cellular networks (also known as mobile networks).

Phase tracking reference signals (PTRS) were introduced in new radio (NR) to enable compensation of oscillator phase noise. Typically, phase noise increases as a function of oscillator carrier frequency. A degradation caused by phase noise in an orthogonal frequency-division multiplexing (OFDM) signal is an identical phase rotation of all the subcarriers, known as common phase error (CPE). PTRS may be used at high carrier frequencies (such as millimeter Wave or mmWave) to mitigate phase noise. PTRS has low density in the frequency domain and high density in the time domain, since the phase rotation produced by CPE is identical for all subcarriers within an OFDM symbol. PTRS is UE device-specific, confined in a scheduled resource block (RB) and may be beamformed. The number of PTRS ports may be lower than the total number of demodulation reference signals (DMRS) ports, and orthogonality between PTRS ports is achieved by means of FDM. PTRS is configurable depending on the quality of the oscillators, allocated bandwidth (BW), carrier frequency, OFDM subcarrier spacing, and modulation and coding schemes used for transmission.

There is a problem in that UE devices may not be able to locate a correct PTRS port corresponding to the PTRS. Furthermore, there is a problem that PTRS may collide with other reference signals, such as DMRS, sounding reference signal (SRS), channel-state information reference signal (CSI-RS) and/or PTRS. Hence, there is a need to define the PTRS location and improve control of networks, for example cellular networks, so as to improve provision of PTRS amongst allocations of RBs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of controlling a network so as to support an optimized location and/or density of transmission/reception points (TRPs) and/or user equipment (UE) devices while maintaining and/or improving system performance and/or quality of service (QoS).

In accordance with an aspect of the disclosure, a method of providing a phase tracking reference signal (PTRS) amongst a set of resource blocks (RBs) is provided. Here, the set of RBs may be scheduled or selected by the TRP to transmit data to the UE device. The method includes selecting a particular RB from the set of RBs, providing the PTRS in the particular RB; and transmitting at least a part of the set of RBs including the particular RB, wherein a location of the particular RB is locatable by a user equipment (UE) device from the set of RBs.

In accordance with another aspect of the disclosure, a set of RBs is provided. The set of RBs includes a PTRS provided in a particular RB amongst the set of RBs, wherein a location of the particular RB amongst the set of RBs is defined, and wherein the PTRS is locatable by a UE device from amongst the set of RBs.

In accordance with another aspect of the disclosure, a TRP and a UE device, wherein the system is configured to provide a PTRS amongst a set of RBs are provided. The TRP and UE device include selecting a particular RB from the set of RBs, and providing the PTRS in the particular RB, wherein the UE device is configured to locate the PTRS from amongst the set of RBs.

In accordance with another aspect of the disclosure, a method of providing a PTRS to a UE device is provided. The method includes selecting a particular RB from a set of RBs, providing, by a TRP, the PTRS in the particular RB, transmitting, by the TRP, at least a part of the set of RBs including the particular RB, receiving, by the UE device, the part of the set of RBs including the particular RB, and locating, by the UE device, the PTRS from the particular RB from amongst the set of RBs according to the defined location thereof.

In accordance with another aspect of the disclosure, a transmission/reception point (TRP) configured to communicate with a UE device is provided, wherein the TRP is configured to provide a phase tracking reference signal (PTRS) amongst a set of resource blocks (RBs), including: selecting a particular RB from the set of RBs, providing the PTRS in the particular RB, and transmitting at least a part of the set of RBs including the particular RB wherein a location of the particular RB is locatable by a user equipment (UE) device from the set of RBs.

In accordance with another aspect of the disclosure, a user equipment (UE) device configured to communicate with a transmission/reception point (TRP) is provided, wherein the UE device is further configured to locate a phase tracking reference signal (PTRS) from amongst a set of RBs, wherein the PTRS is provided amongst the set of RBs including defining a location of a particular RB amongst the set of RBs, and providing the PTRS in the particular RB.

In accordance with another aspect of the disclosure, there is provided a tangible non-transient computer-readable storage medium having recorded thereon instructions which when implemented by a transmission/reception point (TRP) and/or a user equipment (UE) device, cause the TRP and/or the UE device to perform any of the methods as set forth herein.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A and 5B schematically depict sets of resource blocks (RBs) for reference according to various embodiments of the disclosure;

FIGS. 7A and 7B schematically depict sets of RBs according to various embodiments of the disclosure;

FIGS. 9A and 9B schematically depict sets of RBs according to various embodiments of the disclosure.

Throughout the drawings, like reference numerals will be understood to refer to like parts, components, and structures.

DETAILED DESCRIPTION

Figure 1:
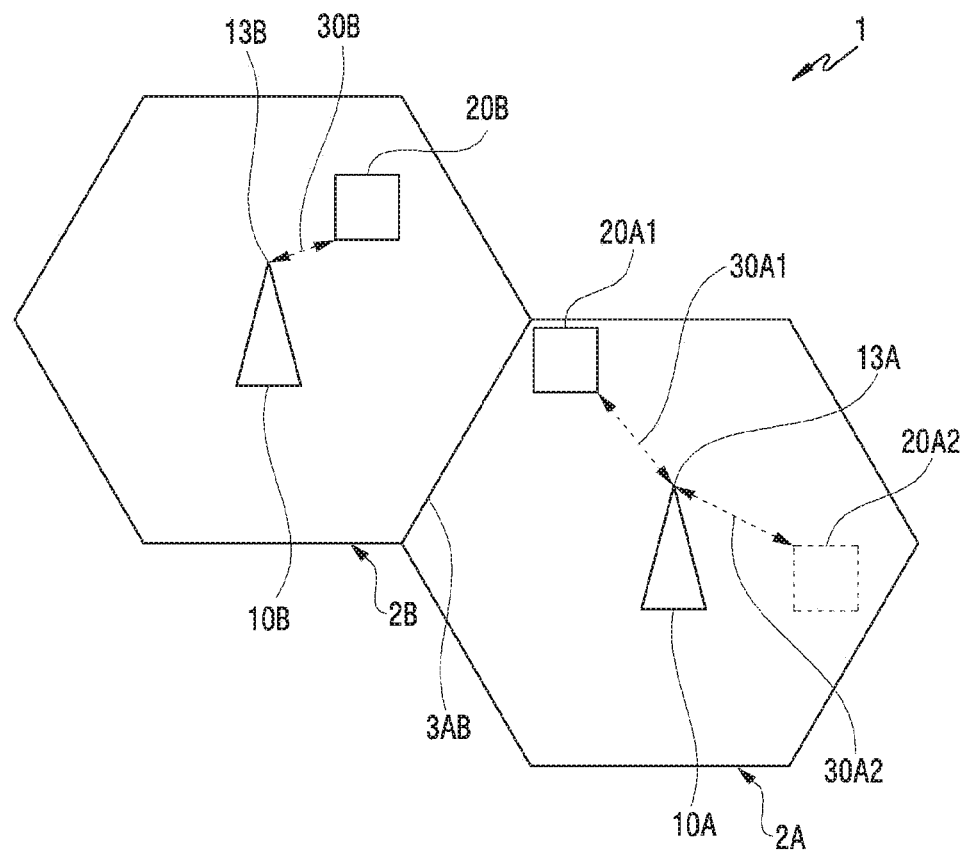
FIG. 1 schematically depicts a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the present disclosure there is provided a method of as set forth in the appended claims. Also provided area set of resource blocks (RBs), a transmission/reception point (TRP), a user equipment (UE) device, a system comprising a TRP and a UE device, a method thereof and a computer-readable storage medium. Other features of the disclosure will be apparent from the dependent claims, and the description that follows.

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or embodiment of the disclosure, as set out herein are also applicable to all other aspects or various embodiments of the disclosure, where appropriate. In other words, the skilled person reading this specification should consider the optional features for each aspect or embodiment of the disclosure as interchangeable and combinable between different aspects and various embodiments.

Network

Generally, in universal mobile telecommunications system (UMTS) and 3GPP long term evolution (LTE), UE devices allow users to access network services. In other words, a UE device is any device used by a user to communicate on a network. The UE device may be, for example, a device comprising a transmitter and a receiver or a transceiver, such as a mobile telephone or a laptop computer equipped with a mobile broadband adapter. The user may be a human user or a non-human user, for example a vehicle or infrastructure. The UE device may connect to or communicate with or via an access point (AP) for example a universal terrestrial radio access network (UTRAN) access point such as a base station node B (Node B or NB) and/or an evolved base station node B (eNodeB or eNB and/or a gNodeB (gNB)). That is, the UE device may transmit data to and/or receive data from the access point, as described below. Furthermore, the device may connect to or communicate with or via another such UE device.

The TRP comprises and/or is an access point, for example a UTRAN access point. It should be understood that an UTRAN access point may be a conceptual point within the UTRAN performing radio transmission and reception. The UTRAN access point may be associated with one specific cell. That is, there may exist one UTRAN access point, for example a TRP, for each cell. The UTRAN access point may be the UTRAN-side end point of a radio link. In other words, the TRP may define a cell.

It should be understood that a cell may be a radio network object that may be uniquely identified by the UE device from a cell identification that is broadcast over a geographical area from one UTRAN access point. A cell may be in either frequency division duplex (FDD) or time division duplex (TDD) mode.

It should be understood that a sector may be a sub-area of a cell. All sectors within the cell may be served by the same access point. A radio link within the sector may be identified by a single logical identification belonging to the sector.

Reference Signals

New radio (NR) in 5G communication system seeks to minimize always-on transmissions to enhance network energy efficiency and ensure forward compatibility. In contrast to LTE, reference signals in NR are transmitted only when necessary. The four main reference signals are the demodulation reference signal (DMRS), phase-tracking reference signal (PTRS), sounding reference signal (SRS) and channel-state information reference signal (CSI-RS).

DMRS is used to estimate the radio channel for demodulation. DMRS is UE device-specific, may be beamformed, confined in a scheduled resource block (RB), and transmitted only when necessary, both in downlink (DL) and uplink (UL). To support multiple-layer multiple input, multiple output (MIMO) transmission, multiple orthogonal DMRS ports may be scheduled, one for each layer. Orthogonality is achieved by frequency division multiplexing (FDM), time division multiplexing (TDM) and code division multiplexing (CDM). For low-speed scenarios, DMRS uses low density in the time domain. However, for high-speed scenarios, the time density of DMRS is increased to track fast changes in the radio channel.

As described previously, phase tracking reference signals (PTRS) were introduced in NR to enable compensation of oscillator phase noise. Typically, phase noise increases as a function of oscillator carrier frequency. A degradation caused by phase noise in an orthogonal frequency-division multiplexing (OFDM) signal is an identical phase rotation of all the subcarriers, known as common phase error (CPE). PTRS may be used at high carrier frequencies (such as millimeter Wave or mmWave) to mitigate phase noise. PTRS has low density in the frequency domain and high density in the time domain, since the phase rotation produced by CPE is identical for all subcarriers within an OFDM symbol. PTRS is user equipment (UE) device-specific, confined in a scheduled resource block (RB) and may be beamformed. The number of PTRS ports may be lower than the total number of DMRS ports, and orthogonality between PTRS ports is achieved by means of FDM.

PTRS is configurable depending on the quality of the oscillators, allocated BW, carrier frequency, OFDM subcarrier spacing, and modulation and coding schemes used for transmission.

The SRS is transmitted in UL to perform CSI measurements mainly for scheduling and link adaptation. For NR, SRS may be used for reciprocity-based precoder design for massive MIMO and UL beam management. The approach for CSI-RS is similar.

Method

In one example, there is provided a method of providing a phase tracking reference signal, (PTRS) amongst a set of resource blocks (RBs). Here, the set of RBs may be scheduled or selected by the TRP to transmit data to the UE device. The method includes selecting a particular RB amongst the set of RBs, providing the PTRS in the particular RB, and transmitting at least a part of the set of RBs including the particular RB wherein a location of the particular RB is locatable by a user equipment (UE) device from the set of RBs.

Here, the particular RB is made up of 12 frequency sub-carriers and 14 time symbols (in the normal case) in the 2-D frequency-time grid. Thus, the RB is made up of 12×14=168 transmit points (resource elements or REs). Furthermore, providing the PTRS in the particular RB means more specifically assigning some of the REs for PTRS in the RB.

Table 1 includes PTRS frequency densities df for 60 and 120 kHz subcarrier spacing (SCS). If a frequency density df is 1/n, then every n-th RB in the scheduled BW carries a PTRS.

TABLE 1

| PTRS frequency density df | |
|---|---|
| Contiguous Scheduled BW | Frequency density (1/n) |
| NRB < [3 or 1] | No PTRS |
| [3 or 1] ≤ NRB < [5] | [1] |
| [5] ≤ NRB < [10] | [1/2] |
| [10] ≤ NRB < [15] | [1/3] |
| [15] ≤ NRB | 1/4 |

A frequency density of the PTRS may be every other RB (i.e. alternate RBs such that df=1/2) or every fourth RB (i.e. such that df=1/4, for example. Other frequency densities of the PTRS are possible, for example df=1/1, df=1/8 or df=1/16.

Hence, for a number N of RBs allocated to a UE device and a frequency density df of PTRS, the exact RB location of the PTRS cannot be identified either for contiguous RB allocation or non-contiguous RB allocation according to the related art. Hence, the disclosure described herein solves this problem.

In one example, the set of RBs is an allocation of RBs, for example, for the UE device. In one example, the set of RBs is a contiguous allocation of RBs. In one example, the set of RBs is a non-contiguous allocation of RBs (i.e. comprising a plurality of groups of RBs). The set of RBs may have a size N, where N is a positive integer.

In one example, the method comprises providing a plurality of PTRS amongst the set of RBs in a respective plurality of particular RBs in a defined plurality of respective locations. The plurality of PTRS may be provided periodically (for example, regularly), for example at a frequency (also known as a frequency density) df. The frequency density df may be, for example, 1/2 (i.e. alternate RBs), 1/4 (i.e. every fourth RB), 1/8 (i.e. every eighth RB), etc., thereby defining repeating blocks including n RBs, for example 2 RBs, 4 RBs, 8 RBs, etc. respectively. It should be noted that the PTRS allocation can either be evenly distributed (i.e. periodic or regular) or non-evenly distributed (i.e. aperiodic or irregular).

In one example, the location is defined as an offset Poffset from a first RB in the set of RBs and/or a first RB in a repeating block thereof. The offset Poffset may be a natural number including 0, for example 0, 1, 2, . . . , n–1 or N–1.

In one example, the set of RBs includes physical resource blocks (PRBs), virtual resource blocks (VRBs) and/or logically-defined resource blocks, for example. It should be noted that RBs are not limited to physical RB or virtual RB but also any logic RB mapping. Basically, the logical BW requirement per UE can be mapped to the physical RBs or virtual RBs. The PTRS allocation should be aware of this mapping and can consider this mapping among other factors such as RS collision in deciding PTRS offset, for example.

In one example, defining the location of the particular RB amongst the set of RBs comprises defining a predetermined location, for example at a fixed offset, of the particular RB amongst the set of RBs.

In this way, a UE device may locate the PTRS from amongst the allocation of RBs, since the location of the particular RB is the predetermined location. This may be a relatively lightweight method of defining the location of the particular RB, thereby reducing processing and/or signaling requirements, for example.

In one example, the method comprises isolating the PTRS in the particular RB from a reference signal provided in another RB amongst the set of RBs. For example, a location of the particular RB may be according to a configurable offset based on other RS configurations.

In this way, collisions between the PTRS and other RSs, such as DMRS, CSI-RS SRS and/or PTRS may be avoided, such that the PTRS is not punctured, and may be decided depending on configurations and densities of the other RSs, such as DMRS, CSI-RS SRS and/or PTRS, which may be transmitted for the UE device or another UE device.

In one example, the set of RBs comprises a non-contiguous set of RBs and wherein providing the PTRS in the particular RB comprises providing the PTRS in the particular RB in a non-contiguous portion (for example, a group thereof) of the set of RBs. For example, a location of the particular RB may be according to a configurable offset to avoid RB groups without PTRS.

In this way, some or all of groups of the non-contiguous set of RBs may include a PTRS.

In one example, the method comprises isolating the PTRS in the particular RB from a reference signal provided amongst another set of RBs. For example, this may apply to different UE devices in multiple users, multiple input multiple output (MU-MIMO).

Three cases may be considered as follows:
1. Different DMRS ports are allocated to different UE devices;
2. Same DMRS ports are allocated to different UE devices; and
3. DMRS ports allocated to different UE devices partially overlap.

In the first case, different DMRS ports are allocated to different UE devices. While collision between the PTRS and the DMRS may be considered to generally not occur, even if different DMRS ports are allocated to different UE devices, the DMRS ports allocated to different UE devices could still have the same location when CDM DMRS is considered. That is, if different DMRS ports are allocated to different UE devices but they share the same location as the PTRS, collision may occur and a method, as described below with reference to case 2, may be provided.

In the second case, the same DMRS ports are allocated to different UE devices. In order to achieve interference randomization, for example to avoid interference of a PTRS in a particular RB from a reference signal provided amongst another allocation of RBs, different PTRS offsets PTRS RB Poffset values may be defined for the different UEs. These different PTRS offsets PTRS RB Poffset values may be predefined or may be dynamically and/or semi-persistently configured, for example.

In the third case, DMRS ports allocated to different UE devices partially overlap. For example, if PTRS ports of the different UE devices are associated with the same DMRS ports, the same configuration principle as case 2 should be employed. Otherwise, if the PTRS ports of the different UE devices are associated with different DMRS ports, the same configuration principle as case 1 should be employed.

In one example, the method comprises signaling the location of the particular RB amongst the set of RBs. In one example the method comprises signaling the location of the particular RB by transmitting the PTRS offset and the frequency density. In one example, signaling the location comprises signaling via radio resource control (RRC) and/or medium access control (MAC) control element (CE) and/or downlink control information (DCI).

In one example, the method comprises signaling a change of the location, for example to a new location, of the particular RB amongst the set of RBs. In one example, signaling the change of the location comprises signaling via radio resource control (RRC) and/or medium access control (MAC) control element (CE) and/or downlink control information (DCI). In one example, the method comprises locating the new location of the particular RB amongst the set of RBs implicitly based on a pre-defined location and/or a lookup table.

In one example, the method comprises including the location of the particular RB amongst the set of RBs in a lookup table. In one example, the method comprises providing a lookup table including the location of the particular RB amongst the set of RBs.

In one example, the lookup table is pre-defined and/or dynamically defined, for example semi-persistently and/or dynamically configured by RRC, MAC CE or DCI.

In one example, the lookup table is based, at least in part, on a RS configuration, for example a DMRS, a PTRS, a SRS and/or a CSI-RS configuration. In one example, the lookup table is based, at least in part, on a configuration of the set of RBs.

In one example, the method comprises locating the location of the particular RB amongst the set of RBs implicitly based on a pre-defined location and/or a lookup table.

In one example, the method comprises locating the location of the particular RB amongst the set of RBs explicitly via RRC, MAC CE or DCI signaling.

In one example, the method comprises comprising redefining the location, for example to a new location, of the particular RB amongst the set of RBs. Redefining the location may comprise signaling a change of the location, as described previously.

In one example, the method includes any combination of the above steps. That is, the above approaches are not mutually exclusive and may be applied at the same time. In this regard, a combination of aforementioned steps may be employed to optimize the PTRS offset configuration and improve the performance. For example, the method may include any combination of: defining the location of the particular RB amongst the set of RBs comprises defining a predetermined location, for example at a fixed offset, of the particular RB amongst the set of RBs; isolating the PTRS in the particular RB from a reference signal provided in another RB amongst the set of RBs; the set of RBs comprises a non-contiguous set of RBs and wherein providing the PTRS in the particular RB comprises providing the PTRS in the particular RB in a non-contiguous portion (for example, a group thereof) of the set of RBs; and/or isolating the PTRS in the particular RB from a reference signal provided amongst another set of RBs, for example.

Set of Resource Blocks (RBs)

In one example, there is provided a set of resource blocks (RBs) comprising a phase tracking reference signal (PTRS) provided in a particular RB amongst the set of RBs, wherein a location of the particular RB amongst the set of RBs is defined, and wherein the PTRS is locatable by a user equipment (UE) device from amongst the set of RBs.

The set of RBs, the PTRS, the particular RB, the location and/or the UE device may be as described herein.

In one example, the location of the particular RB amongst the set of RBs comprises and/or is a predetermined location of the particular RB amongst the set of RBs.

In one example, the particular RB isolates the PTRS from a reference signal provided in another RB amongst the set of RBs.

In one example, the set of RBs comprises a non-contiguous set of RBs and the PTRS is provided in the particular RB in a non-contiguous portion of the set of RBs.

In one example, the particular RB isolates the PTRS from a reference signal provided amongst another set of RBs.

System

In one example, there is provided system including a transmission/reception point, TRP, and a user equipment, UE, device, wherein the system is configured to provide a phase tracking reference signal (PTRS) amongst a set of resource blocks (RBs) including defining a location of a particular RB amongst the set of RBs, and providing the PTRS in the particular RB, wherein the UE device is configured to locate the PTRS from amongst the set of RBs.

The set of RBs, the PTRS, the particular RB, the location, the TRP and/or the UE device may be as described herein.

Method

In one example, there is provided a method of providing a phase tracking reference signal (PTRS) to a user equipment (UE) device, the method may include: defining a location of a particular RB amongst a set of resource blocks (RBs) providing, by a transmission/reception point (TRP) the PTRS in the particular RB; transmitting, by the TRP, at least a part of the set of RBs including the particular RB; receiving, by the UE device, the part of the set of RBs including the particular RB; and locating, by the UE device, the PTRS from the particular RB from amongst the set of RBs according to the defined location thereof.

The set of RBs, the PTRS, the particular RB, the location, the TRP and/or the UE device may be as described herein.

Transmission/Reception Point (TRP)

In one example, there is provided a transmission/reception point (TRP) configured to communicate with a user equipment, UE, device, wherein the TRP is further configured to: provide a phase tracking reference signal, PTRS, amongst a set of resource blocks (RBs) including: defining a location of a particular RB amongst the set of RBs; and providing the PTRS in the particular RB; wherein the PTRS is locatable by a user equipment, UE, device from amongst the set of RBs.

The set of RBs, the PTRS, the particular RB, the location, the TRP and/or the UE device may be as described herein.

UE Device

In one example, there is provided a user equipment, UE, device configured to communicate with a transmission/reception point (TRP) wherein the UE device is further configured to: locate a phase tracking reference signal (PTRS) from amongst a set of RBs, wherein the PTRS is provided amongst the set of RBs including defining a location of a particular RB amongst the set of RBs; and providing the PTRS in the particular RB.

The set of RBs, the PTRS, the particular RB, the location, the TRP and/or the UE device may be as described herein.

CRM

In one example, there is provided a tangible non-transient computer-readable storage medium having recorded thereon instructions which when implemented by a transmission/reception point (TRP) and/or a user equipment (UE) device, cause the TRP and/or the UE device to perform any of the methods as set forth herein.

FIG. 1 schematically depicts a system 1 according to an embodiment of the disclosure. The system 1 comprises a first transmission/reception point (TRP) 10A and a first user equipment (UE) device 20A1. Optionally, the system 1 comprises a second UE device 20A2. Optionally, the system 1 comprises a second TRP 10B and a third UE device 20B.

The system 1 is configured to provide a phase tracking reference signal (PTRS) amongst a set of resource blocks (RBs) 30A1 including selecting a particular RB from the set of RBs 30A1, providing the PTRS in the particular RB and transmitting at least a part of the set of RBs including the particular RB. The first UE device 20A1 is configured to locate the PTRS from amongst the set of RBs 30A1.

For example, the system 1 may be configured to provide the PTRS amongst the set of RBs 30A1 to the first UE device 20A1 by defining a location of a particular RB amongst a set of RBs; providing, by the first TRP 10A, the PTRS in the particular RB; transmitting, by the first TRP 10A, at least a part of the set of RBs 30A1 including the particular RB; receiving, by the first UE device 20A1, the part of the set of RBs 30A1 including the particular RB; and locating, by the first UE device 20A1, the PTRS from the particular RB from amongst the set of RBs 30A1 according to the defined location thereof.

In this way, the PTRS is locatable by the first UE device 20A1 from amongst the set of RBs 30A1.

In more detail, the first TRP 10A comprises the first antenna port 13A and the second TRP 10B comprises the second antenna port 13B. The first TRP 10A defines a first cell 2A. The first UE device 20A1 and the second UE device 20A2 are in the first cell 2A, configured to communicate with the first TRP 10A. The second TRP 10B similarly defines a second cell 2B. The third UE device 20B is in the second cell 2B, configured to communicate with the second TRP 10B. Shown also are similar second and third sets of RBs 30A2 and 30B, respectively. The first cell 2A and the second cell 2B are adjacent, having a boundary 3AB. It will be understood that generally, a plurality of such cells may be provided, each including a plurality of UE devices.

Figure 2:
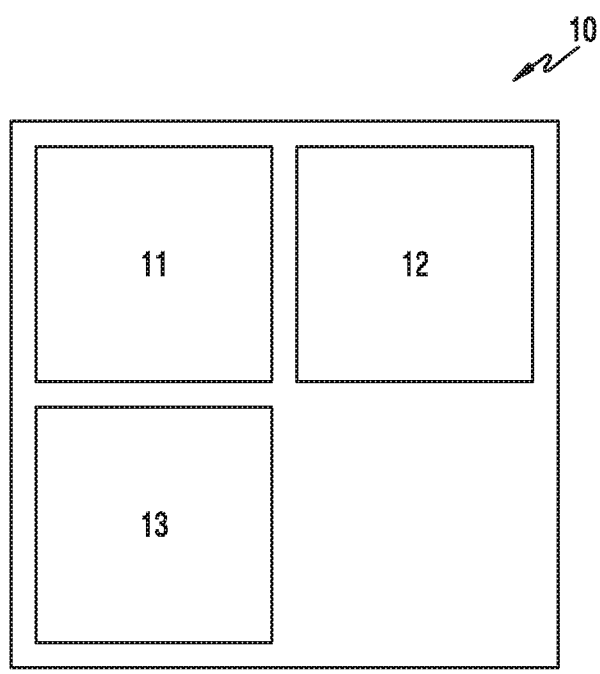
FIG. 2 schematically depicts a transmission/reception point (TRP) of FIG. 1 in more detail according to an embodiment of the disclosure.

FIG. 2 schematically depicts a TRP 10 of FIG. 1 in more detail according to an embodiment of the disclosure.

Particularly, the TRP 10, for example the first TRP 10A and/or the second TRP 10B, is configured to communicate with a UE device 20, for example the first UE device 20A1, the second UE device 20A2 and/or the third UE device 20B.

In more detail, the TRP 10 comprises a transmitter 11 and a receiver 12 and a controller 14, wherein the controller may include at least one processors. The TRP 10 further comprises an antenna port 13, for example the first antenna port 13A or the second antenna port 13B. The term "-module", "-unit" or "-er" used hereinafter may refer to the unit for processing at least one function or operation and may be implemented in hardware, software, or a combination of hardware and software.

The TRP 10 is further configured to provide a phase tracking reference signal (PTRS) amongst a set of RBs, including: selecting a particular RB amongst the set of RBs, providing the PTRS in the particular RB, and transmitting at least a part of the set of RBs including the particular RB. In this way, the PTRS is locatable by a UE device 20 from amongst the set of RBs.

Figure 3:
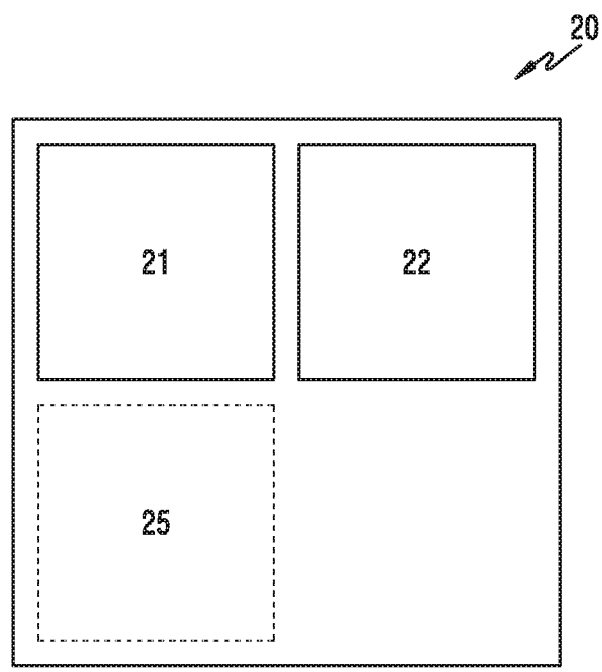
FIG. 3 schematically depicts a user equipment (UE) device of FIG. 1 in more detail according to an embodiment of the disclosure.

FIG. 3 schematically depicts a UE device 20 of FIG. 1 in more detail according to an embodiment of the disclosure.

Particularly, the UE device 20, for example the first UE device 20A1, the second UE device 20A2 and/or the third user device 20B, is configured to communicate with a TRP 10, for example the first TRP 10A and/or the second TRP 10B. The UE device 20 is further configured to locate a phase tracking reference signal (PTRS) from amongst a set of RBs, wherein the PTRS is provided amongst the set of RBs including defining a location of a particular RB amongst the set of RBs; and providing the PTRS in the particular RB.

In more detail, the UE device 20 comprises a transmitter 21 and a receiver 22. The UE device 20 may also comprises a PTRS location determining unit 25, configured to locate the phase tracking reference signal, PTRS, from amongst the set of RBs. The PRTS location determining unit 25 may include at least one processor.

Figure 4:
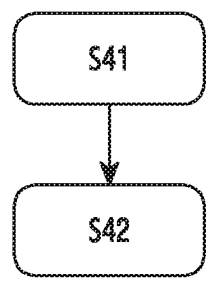
FIG. 4 schematically depicts a method according to an embodiment of the disclosure.

FIG. 4 schematically depicts a method according to an embodiment of the disclosure. The method is of providing a phase tracking reference signal (PTRS) amongst a set of resource blocks (RBs).

At operation S41, a location of a particular RB amongst the set of RBs is defined.

At operation S42, the PTRS is provided in the particular RB.

In this way, the PTRS is locatable by a user equipment, UE, device from amongst the set of RBs.

The method may include any of the steps described herein.

Resource Blocks (RBs)

Figure 5B:
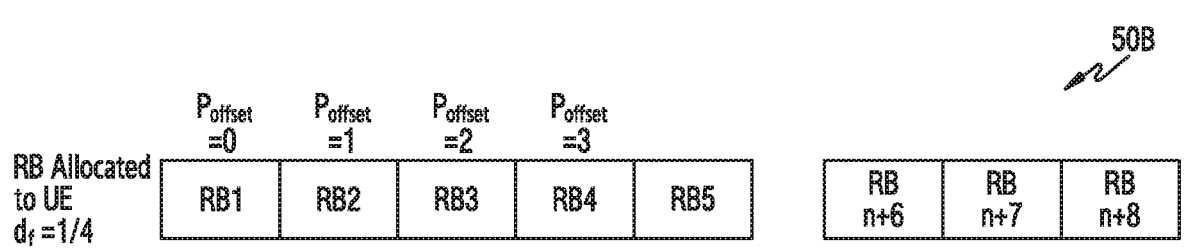

FIGS. 5A and 5B schematically depict sets of RBs for reference according to various embodiments of the disclosure.

Particularly, FIG. 5A shows a contiguous RB allocation 50A (i.e. a set of RBs) for N=8 and df=1/4. A PTRS is not included in this contiguous RB allocation 50A.

Particularly, FIG. 5B shows a non-contiguous RB allocation 50B for N=8 and df=1/4, including two separate groups RB1 to RB5 and RB n+6 to RB n+8. A PTRS is not included in this non-contiguous RB allocation 50B.

Generally, a frequency density of the PTRS may be every other RB (i.e. alternate RBs such that df=1/2) or every fourth RB (i.e. such that df=1/4, for example. Other frequency densities of the PTRS are possible, for example df=1/1, df=1/8 or df=1/16.

If the number of RBs allocated to a UE device is N and the frequency density of the PTRS is df, the exact RB location of the PTRS cannot be identified either for contiguous RB allocation or non-contiguous RB allocation according to the related art. Hence, the disclosure described herein solves this problem.

Fixed Offset

Figure 6:
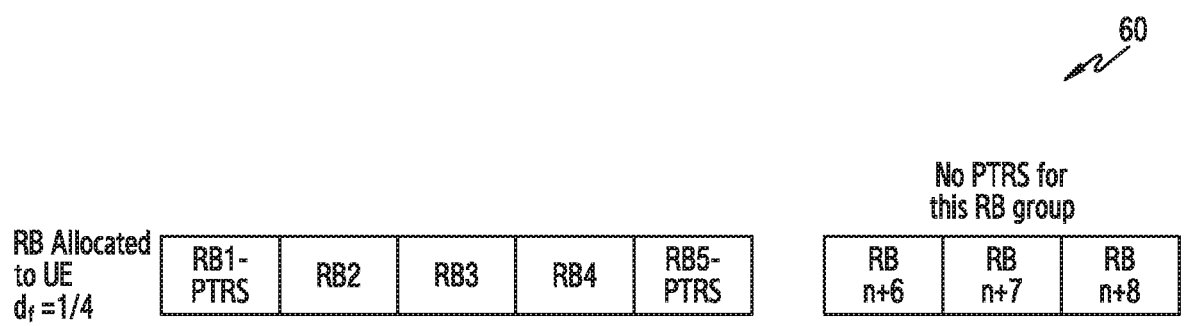
FIG. 6 schematically depicts a set of RBs according to an embodiment of the disclosure.

FIG. 6 schematically depicts a set of RBs 60 according to an embodiment of the disclosure, relating to a predetermined location. For example, a location of the particular RB may be according to a fixed offset PTRS RB offset (Poffset) of a particular RB amongst an allocation of RBs.

Particularly, FIG. 6 shows a non-contiguous RB allocation 60 (i.e. a set of RBs 60) for N=8 and df=1/4, including two separate groups RB1 to RB5 and RB n+6 to RB n+8. A PTRS RB offset Poffset is a fixed value (i.e. a predetermined value) provided in advance to the gNB and the UE device. The PTRS is always located in the Poffset-th RB (i.e. a particular RB), for example Poffset=0, as shown in FIG. 6. That is, the location of the particular RB amongst the allocation of RBs is defined as a predetermined location of the particular RB amongst the allocation of RBs.

In this example, the first group of the RB allocation includes two PTRS (i.e. a first PTRS and a second PTRS), located at RB1 and RB5, respectively. The second group does not include a PTRS.

This example described with reference to FIG. 6 enables a UE device to locate the PTRS from amongst the allocation of RBs, since the location of the particular RB is the predetermined location. This may be a relatively lightweight method of defining the location of the particular RB, thereby reducing processing and/or signaling requirements, for example.

However, if a PTRS collides with other RS, for example, a CSI-RS, the PTRS has to be punctured and performance may be degraded. In addition, a separate group of RBs, such as the second group, may not include a PTRS.

Configurable Offset Based on Other RS Configurations

Figure 7B:

FIGS. 7A and 7B schematically depict sets of RBs 70A and 70B, respectively, according to various embodiment of the disclosure, relating to isolating a PTRS in a particular RB from a reference signal provided in another RB amongst an allocation of RBs. For example, a location of the particular RB may be according to a configurable offset based on other RS configurations.

Particularly, FIGS. 7A and 7B show contiguous RB allocations 70A and 70B respectively (i.e. sets of RBs) for N=8 and df=1/2 for PTRS and CSI-RS. As shown in FIG. 7A, when a PTRS RB offset Poffset=0, there is no requirement to puncture the PTRS with the CSI-RS, for example, since the PTRS and CSI-RS are in different RBs. In contrast, as shown in FIG. 7B, when the PTRS RB offset Poffset=1, the PTRS and the CSI-RS are in the same RBs. Hence, the PTRS needs to be punctured so that performance is degraded. Hence, Poffset=0 is preferred for this example, since performance is not degraded.

Referring to FIGS. 7A and 7B, df=1/2 for PTRS and CSI-RS. For such frequency densities, PTRS can be (+1) offset or (−1) offset against CSI-RS. For other frequency densities df, other shifting rules may be required to avoid collision or puncturing. Generally, the PTRS RB offset Poffset should be decided depending on configurations and densities of other RSs, such as DMRS, CSI-RS SRS and/or PTRS, which may be transmitted for the UE device or another UE device.

Configurable Offset to Avoid RB Groups without PTRS

Figure 8:
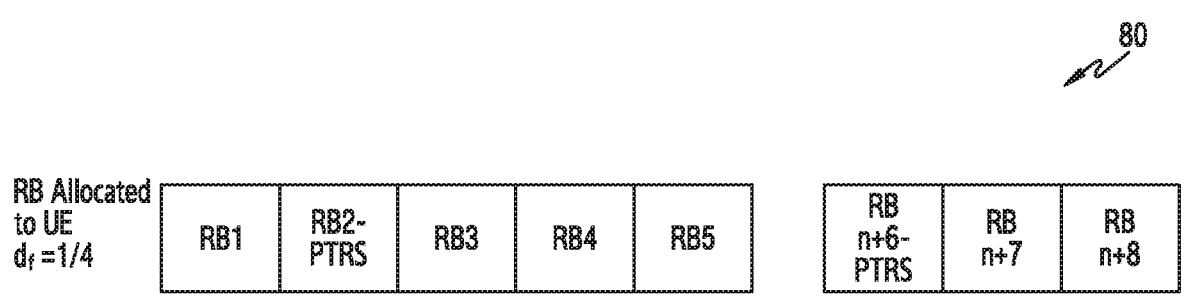
FIG. 8 schematically depicts a set of RBs according to an embodiment of the disclosure.

FIG. 8 schematically depicts a set of RBs 80 according to an embodiment of the disclosure, relating to a non-contiguous allocation of RBs, in which providing a PTRS in a particular RB comprises providing the PTRS in the particular RB in a non-contiguous portion of the allocation of RBs. For example, a location of the particular RB may be according to a configurable offset to avoid RB groups without PTRS.

Particularly, FIG. 8 shows a non-contiguous RB allocation 80 (i.e. a set of RBs) for N=8 and df=1/4, including two separate groups RB1 to RB5 and RB n+6 to RB n+8.

Generally, for non-contiguous RB allocations, there are multiple mutually-separated RB groups. In this example, a PTRS RB Poffset is configured to avoid a situation that some RB groups, such as the second group including RB n+6 to RB n+8, are without PTRS as much as possible.

Hence, if the PTRS RB Poffset=0 (similar to FIG. 6, for example), no PTRS is located in the second RB group. However, if PTRS RB Poffset=1, 2 or 3, each separate group will have at least one PTRS located therein.

Different Offset Values for Different UE Devices in MU-MIMO

FIGS. 9A and 9B schematically depict sets of RBs 90A and 90B, respectively, according to various embodiments, relating to isolating a PTRS in a particular RB from a reference signal provided amongst another allocation of RBs. For example, this may apply to different UE devices in MU-MIMO.

Three cases may be considered:
1. Different DMRS ports are allocated to different UE devices;
2. Same DMRS ports are allocated to different UE devices; and
3. DMRS ports allocated to different UE devices partially overlap.

In the first case, different DMRS ports are allocated to different UE devices. While collision between the PTRS and the DMRS may be considered to generally not occur, even if different DMRS ports are allocated to different UE devices, the DMRS ports allocated to different UEs could still have the same location when CDM DMRS is considered. That is, if different DMRS ports are allocated to different UE devices but they share the same location as the PTRS, collision may occur and a method, as described below with reference to case 2, may be provided.

In the second case, the same DMRS ports are allocated to different UE devices. In order to achieve interference randomization, for example to avoid interference of a PTRS in a particular RB from a reference signal provided amongst another allocation of RBs, different PTRS offsets PTRS RB Poffset values may be defined for the different UEs. These different PTRS offsets PTRS RB Poffset values may be predefined or may be dynamically and/or semi-persistently configured, for example.

FIGS. 9A and 9B show contiguous RB allocations for N=10 and df=1/4, for two different UE devices, a first UE device UE1 and a second UE device UE2, respectively, by way of example of the second case.

For the first UE device UE1, PTRS RB Poffset=0 and hence PTRS for the first UE device UE1 are included in RB1, RB5 and RB9. For the second UE device UE2, PTRS RB Poffset=1 and hence PTRS for the second UE device UE2 are included in RB2, RB6 and RB10. That is, the PTRS for the first UE device UE1 and the second UE device UE2 are mutually isolated and hence do not collide.

In the third case, DMRS ports allocated to different UE devices partially overlap. For example, if PTRS ports of the different UE devices are associated with the same DMRS ports, the same configuration principle as case 2 should be employed. Otherwise, if the PTRS ports of the different UE devices are associated with different DMRS ports, the same configuration principle as case 1 should be employed.

Although a preferred embodiment has been shown and described, it will be appreciated by those skilled in the art that various changes and modifications might be made without departing from the scope of the disclosure, as defined in the appended claims and as described above.

In summary, the disclosure provides a method of providing a phase tracking reference signal (PTRS) amongst a set of resource blocks (RBs). In this way, a UE device may locate a correct PTRS port corresponding to the PTRS. Furthermore, collision of the PTRS with other reference signals may be avoided. Also provided are a set of resource blocks (RBs), a transmission/reception point (TRP), a user equipment (UE) device, a system comprising a TRP and a UE device, a method thereof and a computer-readable storage medium.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) for a phase tracking reference signal (PTRS), the method comprising:
identifying a frequency density and a PTRS offset for a resource block (RB), wherein the PTRS offset is associated with information specific to the UE;
identifying one or more RBs from a set of allocated RBs based on the frequency density and the PTRS offset; and
transmitting or receiving at least one PTRS on the one or more RBs.

2. The method of claim 1, the method further comprising:
receiving information associated with at least one of the frequency density or a location of the one or more RBs based on a radio resource control (RRC) signaling.

3. The method of claim 1,
wherein the frequency density is determined based on a bandwidth of the set of allocated RBs, and
wherein the PTRS offset is configured for the UE.

4. The method of claim 1, wherein the identifying of the one or more RBs comprises:
if the set of allocated RBs is a non-contiguous set of RBs which comprises multiple separated RB groups, assigning the one or more RBs in order that each of the multiple separated RB groups comprises at least one of the one or more RBs.

5. A method performed by a base station (BS) for a phase tracking reference signal (PTRS), the method comprising:
   determining one or more resource blocks (RBs) from a set of allocated RBs based on a frequency density and a PTRS offset for an RB, wherein the PTRS offset is associated with information specific to a user equipment (UE); and
   transmitting or receiving at least one PTRS for the UE on the one or more RBs.

6. The method of claim 5, further comprising:
   transmitting information of at least one of the frequency density or a location of the one or more RBs based on a radio resource control (RRC) signaling.

7. The method of claim 5,
   wherein the frequency density is determined based on a bandwidth of the set of allocated RBs, and
   wherein the PTRS offset is configured for the UE.

8. The method of claim 5, wherein, if the set of allocated RBs is a non-contiguous set of RBs which comprises multiple separated RB groups, assigning the one or more RBs in order that each of the multiple separated RB groups comprises at least one of the one or more RBs.

9. A user equipment (UE) for a phase tracking reference signal (PTRS), the UE comprising:
   at least one transceiver; and
   at least one processor operably coupled to the at least one transceiver,
   wherein the at least one processor is configured to:
      identify a frequency density and a PTRS offset for a resource block (RB), wherein the PTRS offset is associated with information specific to the UE,
      identify one or more RBs from a set of allocated RBs based on the frequency density and the PTRS offset, and
      control the at least one transceiver to transmit or receive at least one PTRS on the one or more RBs.

10. The UE of claim 9,
    wherein the frequency density is determined based on a bandwidth of the set of allocated RBs, and
    wherein the PTRS offset is configured for the UE.

11. The method of claim 1, wherein the PTRS offset depends on the frequency density.

12. The method of claim 5, wherein the PTRS offset depends on the frequency density.

13. The UE of claim 9, wherein the PTRS offset depends on the frequency density.

14. A base station (BS) for a phase tracking reference signal (PTRS), the BS comprising:
    at least one transceiver; and
    at least one processor operably coupled to the at least one transceiver,
    wherein the at least one processor is configured to:
       determine one or more resource blocks (RBs) from a set of allocated RBs based on a frequency density and a PTRS offset for an RB, wherein the PTRS offset is associated with information specific to a user equipment (UE), and
       transmit or receive at least one PTRS on the one or more RBs, and wherein the PTRS offset is specific to the UE.

* * * * *